United States Patent [19]
Gerfast

[11] Patent Number: 5,204,570
[45] Date of Patent: Apr. 20, 1993

[54] SPHEROIDAL MACHINE

[76] Inventor: Sten R. Gerfast, 1802 Valley Curve Rd., Mendota Heights, Minn. 55118

[21] Appl. No.: 756,435

[22] Filed: Sep. 9, 1991

[51] Int. Cl.$^5$ ............................................ H02K 21/21
[52] U.S. Cl. .................................... 310/156; 319/44; 319/89; 319/90; 319/179; 319/208; 319/258
[58] Field of Search ............... 310/258, 156, 166, 157, 310/179, 208, 184, 261, 89, 90, 44, 254

[56] References Cited

U.S. PATENT DOCUMENTS

| | | | |
|---|---|---|---|
| 4,739,241 | 4/1988 | Vachtsevanos | 310/166 |
| 4,814,654 | 3/1989 | Gerfast | 310/156 |
| 4,822,256 | 4/1989 | Laing | 310/166 |
| 4,883,981 | 11/1989 | Gerfast | 310/179 |
| 4,961,352 | 10/1990 | Downer | 310/90.5 |

OTHER PUBLICATIONS

Spherical Motor Torque-Speed, Current Efficiency Curves; Exhibit B; Jun. 6, 1990; Shinado Kenshi Corp.; Japan.
Torque Efficiency Characteristics; Exhibit C; Jan. 18, 1990; Shinado Kenshi Corp.; Japan, (DSC-318-001).
Shinado Kenshi Motor Catalog; Exhibit A; Shinado Kenshi Corp.; 1988; Japan.

*Primary Examiner*—R. Skudy
*Attorney, Agent, or Firm*—Robert E. Granrud

[57] ABSTRACT

A dynamoelectric machine that is both inexpensive and efficient has a rotor including one or more permanent magnets, the working faces of which lie in a spheroid and are centered on the equator of the spheroid. Surrounding the rotor is a brushless stator having spirally wound stator coils. Each coil has a cup-shaped working face centered on said equator and closely spaced from the working faces of the magnet. This dynamoelectric machine can be small, lightweight, and almost twice as efficient as any prior dynamoelectric machine that is equally inexpensive.

16 Claims, 4 Drawing Sheets

SPHEROIDAL MACHINE

BACKGROUND OF THE INVENTION

1. Field of the Invention

The invention concerns dynamoelectric machines, specifically motors and generators (including alternators). The invention especially concerns dynamoelectric machines having brushless stator coils and permanent magnet rotors. The invention also concerns a fixture for winding the stator coils.

2. Description of Related Art

Dynamoelectric machines that have a permanent magnet rotor and a brushless stator of one or more ironless coils can be inexpensive, but typically are inefficient. Greater efficiency can be attained by winding the stator on a stack of laminated steel plates, but with loss of economy, because the production of the steel plates requires expensive tooling, and their assembly with insulating sheets can also be expensive. Furthermore, laminated steel plates greatly increase the weight of a motor and involve eddy current losses.

An inexpensive dynamoelectric machine that has a permanent magnet rotor and one or more substantially ironless coils is disclosed in my U.S. Pat. No. 4,883,981. I believe it to be at least as efficient as any equally inexpensive dynamoelectric machine on the market, and more efficient than most. Another inexpensive dynamoelectric machine is disclosed in my U.S. Pat. No. 4,814,654.

In the embodiment of the dynamoelectric machine shown in FIGS. 10, 11 and 14 of my '981 patent, a plastic frame supports a thin-walled stator coil having a large number of circular turns that form a toroid. The legs of the stator coil extend along the truncated spherical working faces of a permanent magnet rotor which is mounted on a metal shaft that is journalled in the frame so that the working faces of the magnet pass close to the legs of the coil. That and other dynamoelectric machines of said patent can be miniaturized for uses where space is at a premium, e.g., as a fan motor or a motor for driving disks or tapes. Unfortunately, miniaturization can result in reduced efficiencies. Furthermore, miniturized coils can be more difficult to wind, hence more expensive.

SUMMARY OF THE INVENTION

The invention provides a dynamoelectric machine that can be inexpensive and yet surprisingly efficient, even when miniaturized. I have built a prototype of a dynamoelectric machine of the invention that is small, lightweight, and almost twice as efficient as is any equally inexpensive prior dynamoelectric machine of which I am aware, including any of my '981 patent.

Briefly, the dynamoelectric machine of my invention includes (a) a rotor comprising a shaft, (b) at least one permanent magnet fixed to the shaft and having working faces of alternating N and S poles lying substantially in a spheroid and centered on the equator of the spheroid, (c) a brushless stator comprising a stator frame in which the shaft is journalled, and (d) at least one spiral coil of electrically conductive wire fixed to the frame, each coil having a cup-shaped working face centered on said equator and closely spaced from the working faces of the magnet.

The term "spheroid" encompasses prolate and oblate spheroids having a diameter along the axes of from three times or more or from one-third or less the diameter at the equator.

In contrast to the dynamoelectric machine of my invention, the stator coil of FIGS. 10, 11 and 14 of my '981 patent is not a spiral coil.

For optimum economy, in the novel dynamoelectric machine, 1) the stator has an even number of spiral coils, 2) the rotor has one N or S pole for each coil of the stator, and 3) all of the magnet poles rotate into simultaneous coextensive alignment with the working faces of the coils.

Instead, I have operated dynamoelectric machines of my invention having two magnet poles and one, three or four stator coils. Other combinations can be used. However, I see no advantage in any such construction.

Economy of raw materials is realized when each of the magnet poles is provided by a separate permanent magnet, and each magnet is thin orthogonally to its working face. For example, the shape of each magnet can be comparable to that of a plano-convex lens. After a cylindrical magnet has been machined to such a shape, the magnetic flux density at the center of its convex face becomes significantly larger than it was at the center of the cylinder and also significantly larger than at the circular periphery of its convex face. Because the flux density at the center of a spiral coil also is greater at the center of its cup-shaped working face than at its edges, the transfer of magnetic flux between the rotor and stator is at a maximum when the magnet is aligned with the coil.

Costs can also be minimized by employing substantially ironless coils, in which event the spiral coils themselves form the working faces of the stator. When the spiral coils are ironless, they preferably are surrounded by a ferromagnetic shell to provide a return path for the magnetic flux. The ferromagnetic shell preferably is fixed to the rotor shaft to rotate in close proximity to the outer faces of the stator coils. By being part of the rotor, the shell minimizes hysteresis and eddy current losses.

Where greater expense and weight can be tolerated, stator coils can be wound on laminated ferromagnetic plates, edges of which form the cup-shaped working faces of the stator. Such laminations would entail high hysteresis and eddy current losses at high rpm.

For economy, the rotor magnet can be formed from magnetic particles such as anisotropic ferrite particles dispersed in an elastomeric matrix. Such a magnet is machinable. Because it is tedious to create spherical working faces by machining, such magnet material preferably is injection molded to the desired shape and is magnetized while the elastomeric matrix is molten and being cooled. Where greater efficiency is required, higher flux densities can be attained with pressed or sintered ferrite or rare earth magnet materials.

The invention also concerns a novel fixture or jig for spirally winding a stator coil of the novel dynamoelectric machine. Briefly, the novel fixture includes (a) a bobbin having a surface that substantially lies in a spheroid, (b) a cap having an inner-facing surface that substantially lies in a spheroid of slightly larger diameter than that of the bobbin, (c) a thin hub between the centers of the bobbin and inner-facing surface of the cap, and (d) means for rotating the bobbin and cap on the axis of the hub while winding an electrically conductive wire onto the hub to form a spiral coil within the gap between the bobbin and the cap.

The hub should be as small as possible to leave almost no opening in a spiral wire coil that is created in the gap. The gap preferably is from 2 to 15% of the diameter of the rotor. If a coil were wound into a substantially wider gap, flux associated with the outermost convolutions would have little effect.

The surfaces of the bobbin and the cap should be smooth to permit the wire to slide into intimate contact with the preceeding convolution to form a tightly wound coil of uniform thickness. When the surface of the bobbin is substantially hemispherical and used to create a spiral coil having a substantially hemispherical working face, the inner-facing surface of the cap does not need to form a complete hemisphere, because as the winding approaches the equator of the bobbin, the same coil thickness can be obtained without any help from the cap.

BRIEF DESCRIPTION OF THE DRAWING

In the drawing, all figures of which are schematic.

DESCRIPTION OF THE PREFERRED EMBODIMENTS

Figure 2:
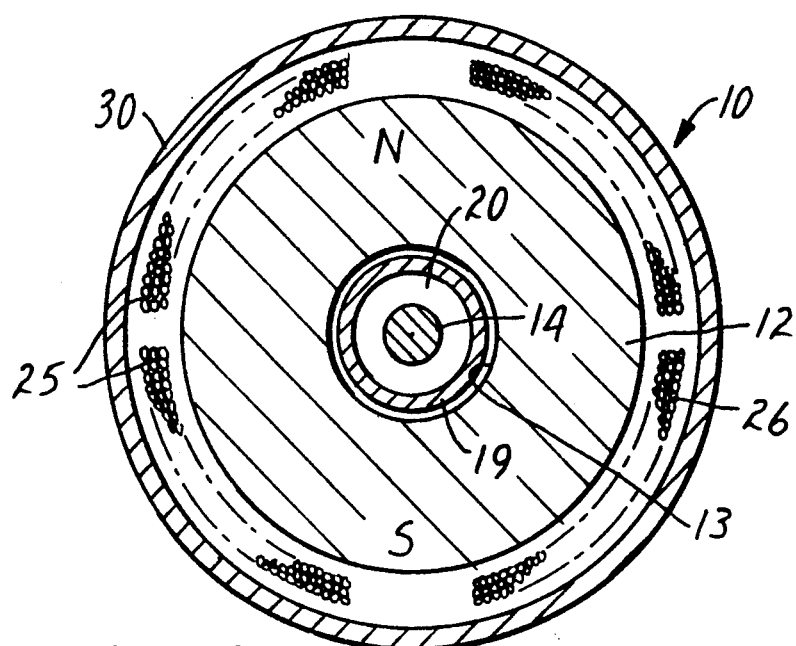
FIG. 2 is a cross section along line 2—2 of FIG. 1.
Figure 1:
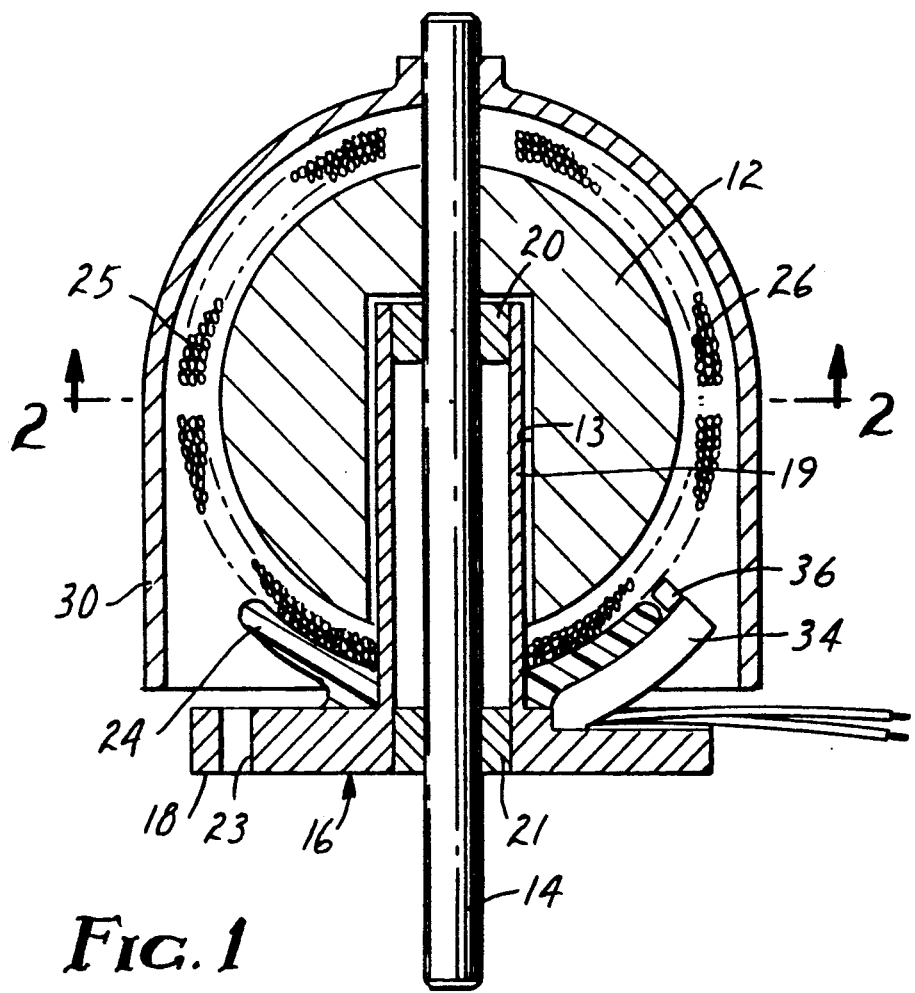
FIG. 1 is a central cross section through an electric motor of the invention.

The electric motor 10 shown in FIGS. 1 and 2 employs a spherical permanent magnet 12 that is formed with a central bore 13 having two diameters. At the smaller diameter of the bore, the magnet is adhesively bonded to a metal shaft 14 to provide a rotor. The surface of the magnet has one N and one S magnet pole, each of which is substantially hemispherical and is centered on the equator of the magnet.

The brushless stator of the electric motor 10 has a frame 16 formed from a single piece of metal to have a disklike flange 18 and a central cylindrical bearing support 19 containing two sleeve bearings 20 and 21 in which the rotor shaft 14 is mounted. The flange 18 is formed with several mounting holes 23 (one shown). Fixed to the flange is a plastic cradle 24 in which are seated a pair of identical ironless stator coils 25 and 26. Each coil is electrically conductive wire that has been spirally wound to be of uniform thickness and to have a cup-shaped working face that is substantially hemispherical and is centered on the equator of the magnet 12. Each spiral coil has been filled with resin (not shown) and is adhesively bonded to the cradle. The two substantially hemispherical magnet poles rotate into simultaneous coextensive alignment with the substantially hemispherical working faces of the coils.

At the larger diameter of the central bore, the magnet 12 is spaced from the bearing support 19. Fixed to the rotor shaft 14 is a domelike ferromagnetic shell 30, the dome of which is closely spaced from the outer faces of the coils 25 and 26. For economy in forming and assembling the shell, it has a cylindrical skirt as shown in FIG. 1, but to provide greater efficiency, the skirt can be reshaped to be closely spaced from the outer faces of the coils, thus providing a better return path for magnetic flux. Formed between the plastic cradle 24 and the disklike flange 18 is a pocket for receiving a drive circuit 34 that supports a Hall sensor 36.

Figure 3:
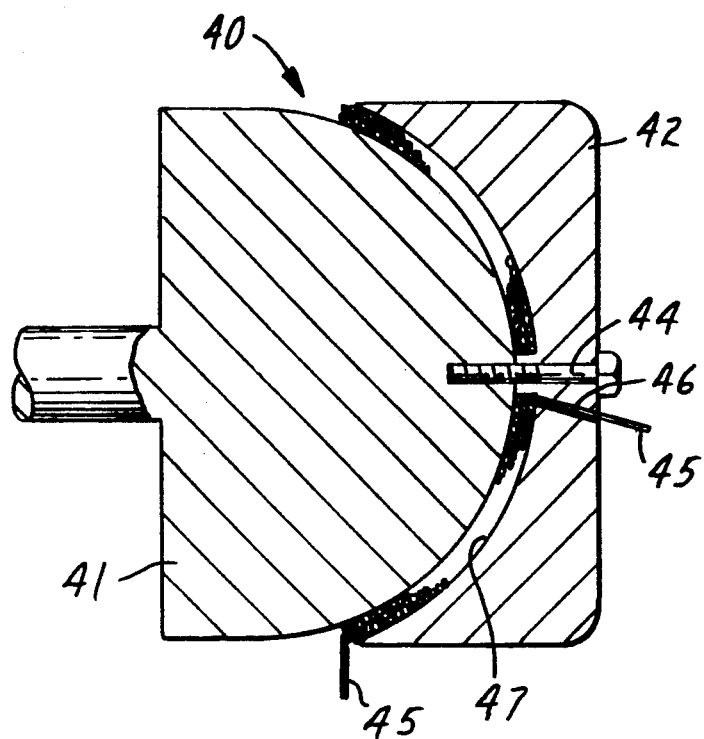
FIG. 3 is a central cross section through a fixture for making a spiral coil for the electric motor of FIG. 1.

FIG. 3 shows a fixture 40 for forming each of the coils 25 and 26. The fixture includes a smooth hemispherical bobbin 41 and a cap 42, the inner facing surface of which is lies in a sphere that is concentric with the surface of the bobbin when the cap is fixed to the bobbin by a screw 44. Before tightening the screw, an electrically conductive wire 45 is fed through a bore 46 in the cap. Rotation of the cap and bobbin on the axis of the screw 44 causes the wire to slide down the smooth surface of the bobbin to be wound around the screw, gradually filling the gap 47 between the cap and bobbin to form a spiral coil that extends beyond the gap. After being removed from the fixture, the coil can be unified by a quick-setting resin (not shown). Upon assembling the coils 25 and 26 into the electric motor 10, the starting ends of the wire 45 of the two coils 25 and 26 are interconnected and their finishing ends are connected to the drive circuit 43 (such connections not being shown).

Figure 5:
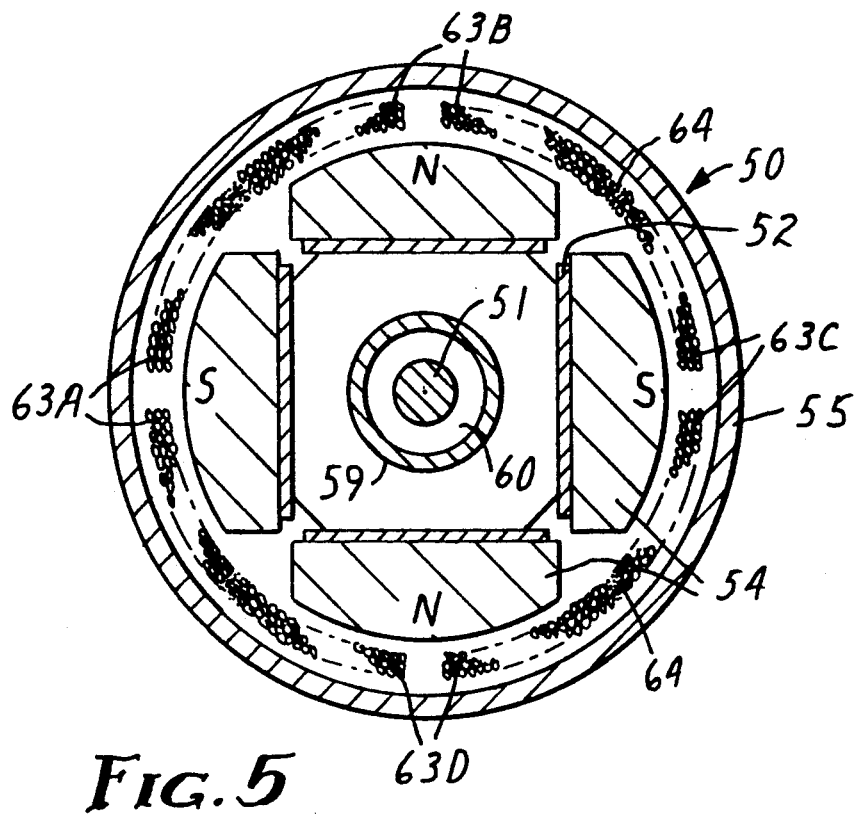
FIG. 5 is a cross section along line 5—5 of FIG. 4.
Figure 4:
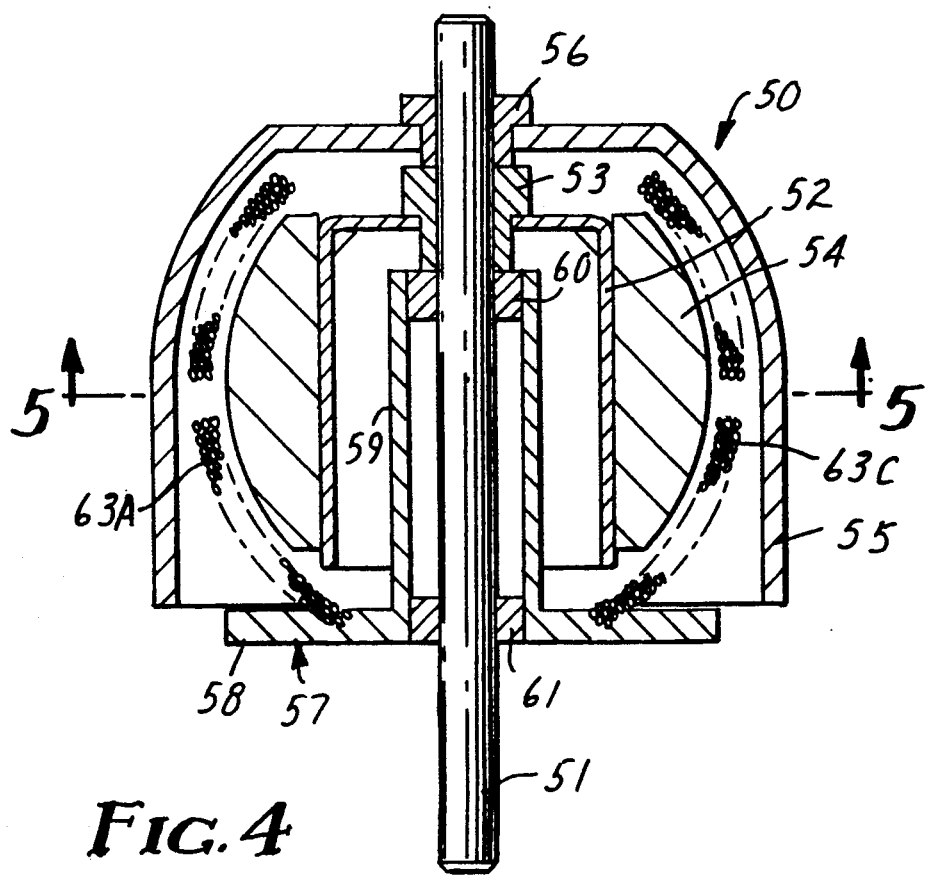
FIG. 4 is a central cross section (like that of FIG. 1) through a second electric motor of the invention.

FIGS. 4 and 5 show a second electric motor 50, the rotor of which includes a metal shaft 51 to which a box-like cage 52 is fixed by a bushing 53. The cage has four flat faces that abut each other to encircle the shaft. Each of the flat faces is perpendicular to the adjacent faces and parallel to and equidistant from the axis of the shaft. Adhesively bonded to each face of the cage is a permanent magnet 54 shaped like a plano-convex lens. Each magnet 54 is thin orthogonally to its working face. The convex working faces of the magnets substantially lie in a sphere and are centered on the equator of the sphere. Each of the magnets is magnetized to have one or a single N or S magnet pole at its working face that is opposite in polarity the outer facing poles of the adjacent magnets. Fixed to the shaft 51 by a bushing 56 is a domelike ferromagnetic shell 55.

The brushless stator of the electric motor 50 has a frame 57 formed from a single piece of metal to have a disklike flange 58 and a cylindrical bearing support 59 containing a pair of bearings 60 and 61 in which the shaft 51 is journalled. The flange 58 has a circular recess receiving the edges of four identical, resin-unified, spiral coils 63A-D of rosette shape. Each coil is aligned with the magnets 54, is of uniform thickness, and has a cup-shaped working face which substantially lies in a sphere that is closely spaced from and concentric with the sphere defined by the working faces of the magnets 54. For structural strength, the adjacent edges of the coils 63A-D are interconnected by adhesive 64 and also are adhesively bonded to the flange 58 at its circular recess.

Figure 7:
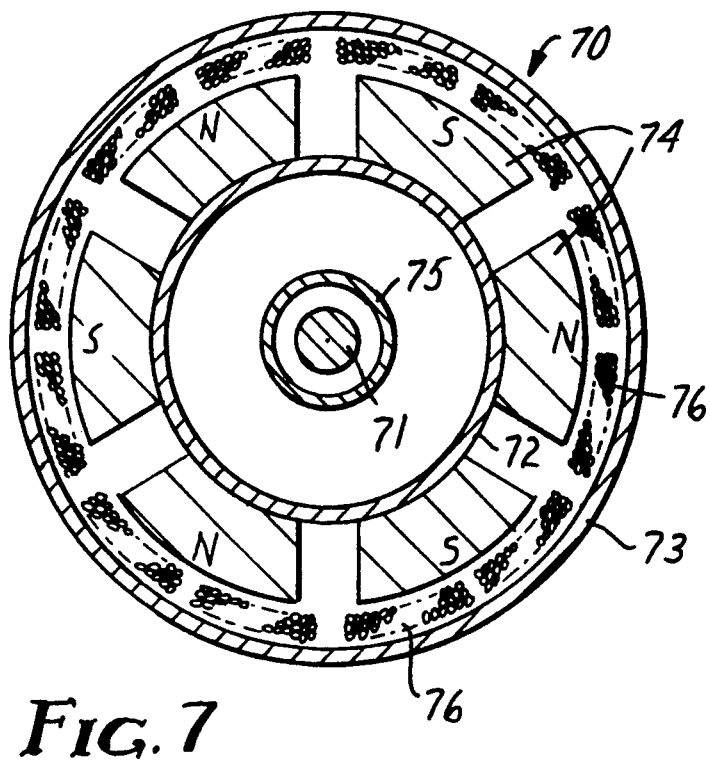
FIG. 7 is a cross section along line 7—7 of FIG. 6.
Figure 6:
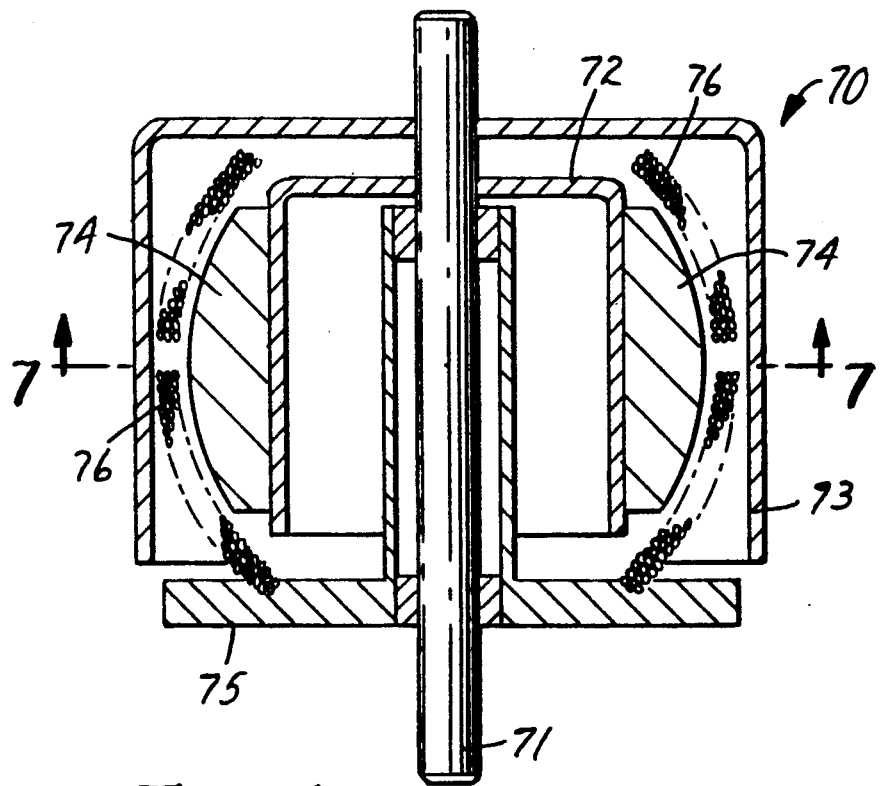
FIG. 6 is a central cross section (like that of FIG. 1) through a third electric motor of the invention.

FIGS. 6 and 7 show a third electric motor 70, the rotor of which has a shaft 71 to which a hub 72 is fixed. Adhesively bonded to the cylindrical surface of the hub are six permanent magnets 74. The working faces of the magnets substantially lie in a sphere and are centered on its equator. Each magnet has one N or S magnet pole at its working face that is opposite in polarity to those of the adjacent magnets. Also fixed to the shaft 71 is a ferromagnetic shell 73.

The brushless stator of the electric motor 70 has a frame 75 that supports six identical, resin-unified, spiral coils 76. The six magnets 74 rotate into simultaneous coextensive alignment with the working faces of the six coils 76. The electric motor 70 rotates at 1200 rpm at 120 Hz, 60 cycles.

Figure 8:
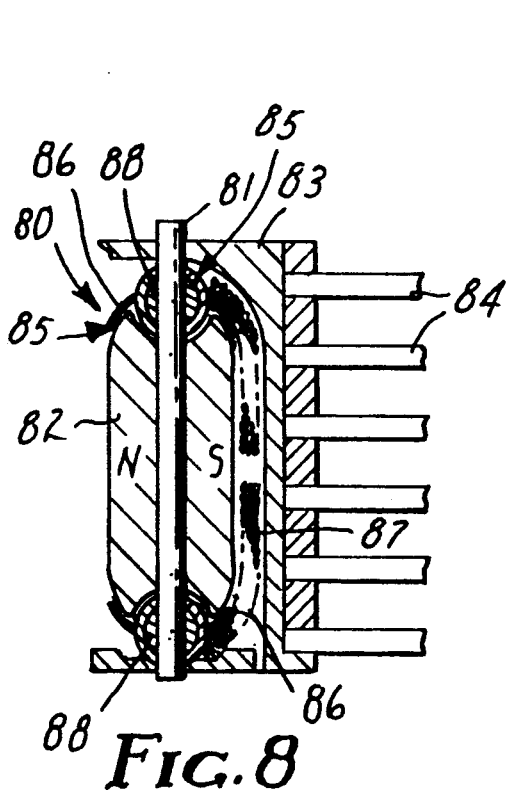
FIG. 8 is a fragmental central cross section through a magnetic-disk drive that incorporates an electric motor of the invention.

FIG. 8 shows a magnetic-disk drive that incorporates an electric motor 80, the rotor of which has a shaft 81 and two identical permanent magnets 82 that are adhesively bonded both to the shaft and to each other along a plane containing the axis of the shaft. Each of the magnets 82 has one S or N magnet pole at its working face that substantially lies in a prolate spheroid. Also fixed to the shaft 81 is a ferromagnetic shell 83 that supports six rigid magnetic disks 84.

Figure 9:
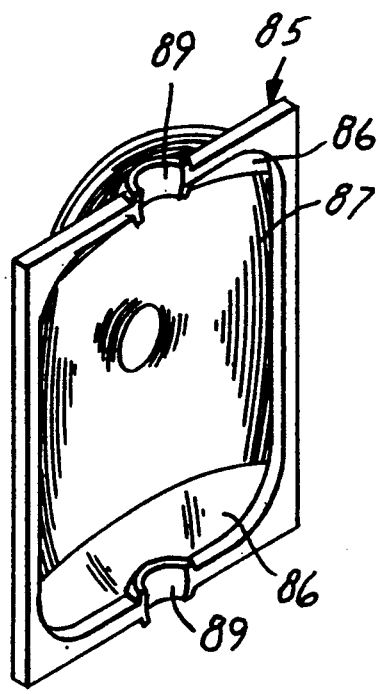
FIG. 9 is a perspective view of one-half of the stator of the magnetic-disk drive of FIG. 8.

The brushless stator of the electric motor 80 has a two-piece frame 85, each half of which includes a pair of webs 86 that have convex outer surfaces supporting one of a pair of identical, resin-unified, spiral coils 87 (one shown in each of FIGS. 8 and 9). A pair of spherical sleeve bearings 88 are mounted in sockets 89 formed in the frame 85. The working faces of the two magnets 82 rotate into simultaneous coextensive alignment with the working faces of the two coils 87.

EXAMPLE 1

An electric motor has been constructed as shown in FIGS. 1 and 2 except that the disklike flange 18 and central cylindrical bearing support 19 were two press-fitted pieces of steel. The permanent magnet 12 was formed by laminating ¼-inch magnetic disks (anisotropic barium ferrite particles dispersed in an elastomeric matrix) and machining the laminate in the shape of a sphere 1.5 inches in diameter. Other key dimensions were:

| | |
|---|---|
| steel shaft 14 | 0.187" diameter |
| disklike flange 18 | 1.75" diameter |
| bearing support 19 | 0.5" diameter |
| wire of coils 25, 26 | 0.011" diameter |
| number of turns/coil | 250 |
| spacing between magnet and coils | 0.015" |
| steel shell 30 | 0.04" thickness |

COMPARISON TESTS

The motor of Example 1 at 12 volts DC, 0.11 amp, produced a torque of 25 gf-cm with a maximum efficiency of 49%.

Under the same conditions, a commercially available ironless coil electric motor of approximately the same size and weight, namely, "DSC-318-001" of Shinano Kenshi Corp. of, Chisagata-gun, Japan, ha maximum efficiency of 26%. Subsequent testing by Shinano Kenshi produced maximum efficiency values of 51% and 30% for the motor of Example 1 and the DSC-318-001 motor, respectively.

Also tested for comparison was a "Motor A" of my U.S. Pat. No. 4,883,981. Its maximum efficiency was 29%.

These three motors should be of comparable cost in large-scale production.

EXAMPLE 2

An electric motor has been constructed as shown in FIGS. 4 and 5 using magnets of anisotropic barium ferrite particles dispersed in an elastomeric matrix. Key dimensions were:

| | |
|---|---|
| steel shaft 51 | 0.187" diameter |
| faces of box-like cage 52 | 1.25" square |
| sphere defined by magnets 54 | 2" diameter |
| each magnet 54 | 1.5" truncated height 0.5" max. thickness |
| wire of coils 63 | 0.008" diameter |
| number of turns/coil | 600 |
| spacing between magnet and coils | 0.015" |

EXAMPLE 3

A magnetic-disk drive has been constructed as shown in FIGS. 8 and 9 using neodymium magnets. Key dimensions were:

| | |
|---|---|
| steel shaft 81 | 0.078" diameter |
| prolate sphere of magnets 82 at equator | 0.5" diameter |
| in axial direction | 1.0" diameter |
| truncated length of magnets 82 | 0.7" |
| wire of coils 87 | 0.008" diameter |
| number of turns/coil | 300 |
| spacing between magnet and coils | 0.01" |

While each of the dynamoelectric machines shown in the drawing and disclosed in the examples is described as a motor, each could be used as a generator or alternator.

What is claimed is:

1. A dynamoelectric machine comprising
   (a) a rotor comprising a rotatable shaft,
   (b) at least one permanent magnet fixed to the shaft and having working faces of alternating N and S magnet poles lying substantially in a spheroid that has the shaft as its axis and has an equator, each magnet pole being centered on the equator of the spheroid,
   (c) a stator comprising a frame in which the shaft is journalled, and
   (d) at least one spiral coil of electrically conductive wire fixed to the frame, each coil having a cup-shaped working face centered on said equator and closely spaced from the working faces of the magnet.

2. A dynamoelectric machine as defined in claim 1 wherein the spheroid is a prolate spheroid.

3. A dynamoelectric machine as defined in claim 1 wherein
   1) the stator has an even number of spiral coils,
   2) the rotor has one pole for each coil of the stator, and
   3) all of the magnet poles rotate into simultaneous coextensive alignment with the working faces of the coils.

4. A dynamoelectric machine as defined in claim 3 wherein each of the magnet poles is provided by a separate permanent magnet, and each magnet is thin orthogonally to its working face.

5. A dynamoelectric machine as defined in claim 4 wherein each magnet is shaped like a plano-convex lens.

6. A dynamoelectric machine as defined in claim 5, the stator frame of which comprises a symmetrical box-like cage having an even number of flat faces that abut each other to encircle the shaft, each of which faces is parallel to and equidistant from the axis of the shaft.

7. A dynamoelectric machine as defined in claim 6 wherein the stator is substantially ironless, and each of the stator coils is spiral and substantially uniform in thickness.

8. A dynamoelectric machine as defined in claim 7 wherein the coils are surrounded by a ferromagnetic shell to provide a return path.

9. A dynamoelectric machine as defined in claim 8 wherein the ferromagnetic shell is a domelike shell which is closely spaced from the working faces of the coils.

10. A dynamoelectric machine as defined in claim 9 wherein the ferromagnetic shell is fixed to the rotatable shaft to rotate in close proximity to the working faces of the coils.

11. A dynamoelectric machine as defined in claim 1 wherein said at least one permanent magnet comprises magnetic particles dispersed in an elastomeric matrix.

12. A dynamoelectric machine as defined in claim 1 wherein the shaft is journalled in the stator frame.

13. A dynamoelectric machine as defined in claim 1 wherein each magnet has a convex working face that is a single pole.

14. A dynamoelectric machine comprising
   (a) a rotor including a rotatable steel shaft on which is mounted a symmetrical box-like cage having an even number n of flat faces that abut each other to encircle the shaft, each of which faces is parallel to and equidistant from an axis of the shaft,
   (b) mounted on each face of the cage, a permanent magnet which has a working face that is a single magnet pole, each working face
      (i) lying substantially in a spheroid that has the shaft as the axis and has an equator,
      (ii) being centered on the equator of the spheroid, and
      (iii) having a single magnet pole that is opposite in polarity to the poles of adjacent magnets,
   (c) a brushless stator comprising a stator frame having a disklike flange projecting beyond a central cylindrical bearing support which contains a pair of bearings in which the shaft is journalled,
   (d) n ironless spiral coils of electrically conductive wire, each coil being of uniform thickness, having a cup-shaped working face, and being fixed to the stator frame with each coil closely spaced from the working faces of the permanent magnets, centered on said equator, and adjacent coils substantially touching, and
   (e) all of the magnet poles rotate into simultaneous coextensive alignment with the working faces of the coils.

15. A dynamoelectric machine as defined in claim 14 wherein the box-like cage of the rotor has four flat faces, each of which is perpendicular to the adjacent flat faces.

16. A dynamoelectric machine as defined in claim 14 wherein fixed to the shaft of the rotor is a domelike ferromagnetic shell which is closely spaced from the working faces of the coils.

* * * * *